United States Patent
Hahn (10) Patent No.: US 9,467,939 B2
(45) Date of Patent: Oct. 11, 2016

(54) GATEWAY SELECTION FOR MOBILE COMMUNICATIONS NETWORK ARCHITECTURE OPTIMIZATION

(75) Inventor: Wolfgang Hahn, Bergfelde (DE)

(73) Assignee: Nokia Solutions and Networks Oy, Espoo (FI)

( * ) Notice: Subject to any disclaimer, the term of this patent is extended or adjusted under 35 U.S.C. 154(b) by 69 days.

(21) Appl. No.: 14/390,054

(22) PCT Filed: Apr. 2, 2012

(86) PCT No.: PCT/EP2012/055932
§ 371 (c)(1),
(2), (4) Date: Oct. 2, 2014

(87) PCT Pub. No.: WO2013/149637
PCT Pub. Date: Oct. 10, 2013

(65) Prior Publication Data
US 2015/0055461 A1  Feb. 26, 2015

(51) Int. Cl.
| | | |
|---|---|---|
| H04L 12/26 | (2006.01) | |
| H04W 48/20 | (2009.01) | |
| H04W 48/00 | (2009.01) | |
| H04W 88/16 | (2009.01) | |
| H04W 92/02 | (2009.01) | |
| H04W 76/02 | (2009.01) | |

(52) U.S. Cl.
CPC .......... *H04W 48/20* (2013.01); *H04W 48/17* (2013.01); *H04W 76/022* (2013.01); *H04W 88/16* (2013.01); *H04W 92/02* (2013.01)

(58) Field of Classification Search
None
See application file for complete search history.

(56) References Cited

U.S. PATENT DOCUMENTS

| | | | | |
|---|---|---|---|---|
| 8,295,830 B1 * | 10/2012 | Faccin | ............... | H04W 8/04 370/331 |
| 8,509,163 B2 * | 8/2013 | Guo | ............... | H04W 28/08 370/328 |

(Continued)

FOREIGN PATENT DOCUMENTS

WO    WO 2013/127429 A1    9/2013

OTHER PUBLICATIONS

3GPP TSG SA WG2 Meeting #80, Aug. 30-Sep. 3, 2010, Brunstad, Norway, TD S2-103495, "Impact of Stand-alone L-GW support", Huawei, 17 pgs.

(Continued)

*Primary Examiner* — Michael J Moore, Jr.
(74) *Attorney, Agent, or Firm* — Harrington & Smith (57) ABSTRACT

A gateway control apparatus of a mobile communications network system, which is a termination point of signaling messages according to a first protocol, detects a first selection request via an interface of a first network technology from a mobility management entity, of selecting the gateway control apparatus for communicating user data in the mobile communications network system between an entity of the first protocol and a network of a second protocol. Based on the detected first selection request, the gateway control apparatus selects a distributed gateway device from plural distributed gateway devices for communicating the user data, and provides a second selection request of selecting the distributed gateway device via an interface of a second network technology independent from the first network technology.

14 Claims, 4 Drawing Sheets

(56) References Cited

U.S. PATENT DOCUMENTS

| | | | | |
|---|---|---|---|---|
| 2009/0234956 | A1* | 9/2009 | Wang | H04W 48/17 709/228 |
| 2010/0272115 | A1* | 10/2010 | Ramankutty | H04W 76/041 370/401 |
| 2010/0281151 | A1* | 11/2010 | Ramankutty | G06F 15/173 709/223 |
| 2013/0258900 | A1* | 10/2013 | Kokkinen | H04W 24/00 370/254 |
| 2013/0308604 | A1* | 11/2013 | Jiang | H04W 48/20 370/331 |
| 2014/0026207 | A1* | 1/2014 | Wang | H04L 41/28 726/12 |
| 2014/0140322 | A1* | 5/2014 | Brequigny | H04W 48/17 370/331 |
| 2014/0328246 | A1* | 11/2014 | Xu | H04W 36/08 370/315 |

OTHER PUBLICATIONS

Hahn, Wolfgang, "Flat 3GPP Evolved Packet Core", Oct. 3, 2011, 14th International Symposium, IEEE, Wireless Personal Multimedia Communications, 4 pgs.

* cited by examiner

GATEWAY SELECTION FOR MOBILE COMMUNICATIONS NETWORK ARCHITECTURE OPTIMIZATION

BACKGROUND OF THE INVENTION

1. Field of the Invention

The present invention relates to gateway selection for mobile communications network architecture optimization.

2. Related Background Art

The following meanings for the abbreviations used in this specification apply:
APN access point name
BS base station
CAPEX capital expenditure
CDN content delivery network
CP control plane
EPC evolved packet core (in EPS)
EPS evolved packet system, LTE RAN and EPC
GPRS general packet radio service
GTP GPRS tunneling protocol
GW gateway, S/P-GW
HW hardware
IETF internet engineering task force
IP internet protocol
NAS non access stratum: signaling between MME and UE
SGW serving GW
PGW PDN GW
LTE long term evolution
MME mobility management entity
NW network
OAM operations, administration and management
PDN packet data network
RAN radio access network
SIPTO selective IP traffic offload
TEID tunneling endpoint identifier
UE user equipment, mobile device
UL, DL uplink, downlink
UP user plane To cope with an ongoing and predicted exponential data traffic growth for mobile networks, optimizations for an EPC network architecture are proposed in different research activities. The following technologies are focused:

1. Distribution of Mobility Anchors and Gateway Functions (GWs)
   More direct/optimal routing decreases traffic latency and saves transport costs, in particular for local traffic (cache, CDN, mobile to mobile traffic).
2. Centralization of Network Management and Control Functions
   This helps reducing both operational costs and CAPEX of the overall system. According to EPC Rel.8 architecture, control (MME) and user plane (S/PGW) have been split.
   Centralization means less interfaces to operator backend and management systems which results in less managed objects. Centralization is especially needed if the number of other network functions/nodes is increased, like in the case of distributed GWs as mentioned above.
   Centralized controllers can result in higher HW utilization like in cloud computing environments.
3. Network Virtualization and Programmable Networks
   This promises cost efficiency of future networks e.g. due to network sharing.
   Open Flow protocol was designed to standardize a further separation of control and user plane functions in transport networks that may allow for further cost savings:
   Network nodes for routing and switching can become less expensive as they provide only simple standardized functionality.
   The control plane can be centralized, this in turn allows:
   less expensive network management for the operator;
   decision making using information of the whole network view.
   The control plane of the transport network can cooperate/can be combined with mobile network control functions which allows further optimization of resource usage.

Figure 1:
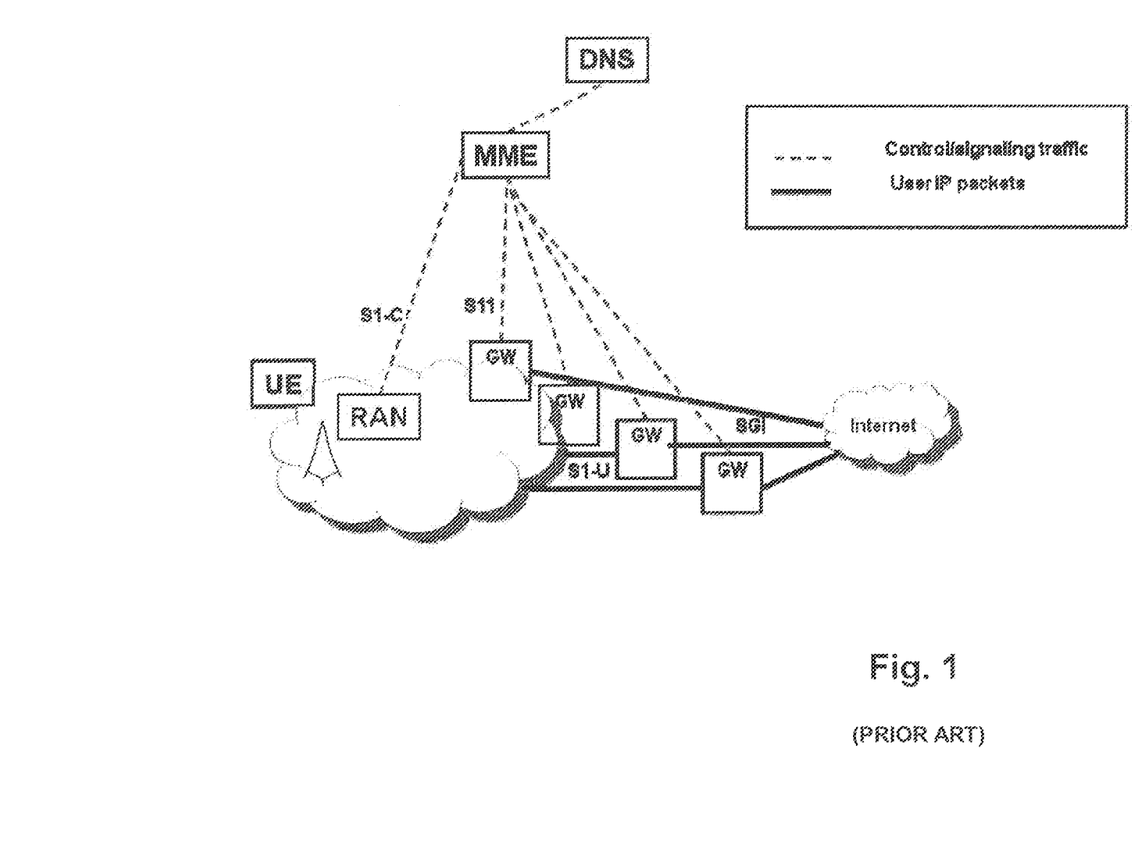
FIG. 1 shows a schematic diagram illustrating a current EPC architecture.

FIG. 1 shows a current EPC network architecture in a simplified manner. S1-C and S11 are CP interfaces between a RAN and an MME and between the MME and GWs, to setup and control user data sessions and GTP tunnels inside the network via an S1-U interface. SGi is an interface between a GW and an IP network, e.g. the Internet, via which user IP packets are communicated. A DNS server is a main support function for selecting a GW by the MME. A DNS query contains an APN used by an UE for data connection and can be enhanced with other information like TAC/eNodeB-ID as location information of the UE. In FIG. 1, dashed lines show control/signaling traffic, and solid lines show user IP packets traffic.

To further evolve the EPC, different technologies as mentioned above can be used. This includes centralization of control functions that are currently distributed in GWs, new mobility procedures (e.g. for GW relocation) or the use of OpenFlow to more dynamically change routing in the network.

With the current architecture this would highly impact the MME as the natural place for centralized mobility management. It would increase the barrier for introducing new and more revolutionary network concepts because an already very complex system would be enhanced with a lot of new functionality.

Operators may be also concerned about the network stability and require a more clear separation for new and old functionality. This separation would also serve for multi vendor scenarios where the MME and the GW might be provided by different vendors. A challenge for the introduction of such new technologies is to allow a stepwise network update for example in specific regions only. And to avoid the need to upgrade all components of the network, e.g. keep changes limited to the core network and stay compatible with the radio network (eNBs).

In the recent 3GPP Release specifications, the MME is responsible for GW selection and the establishment of the connection between eNBs and GWs (GTP tunnels).

With the help of 3GPP Release 10 feature "SIPTO", the MME is able to select GWs depending on UE location in a more distributed way.

SUMMARY OF THE INVENTION

The present invention aims at facilitating a combination of a current centralized (e.g. MME) functionality and a new centralized network functionality in a mobile communications network system.

This is achieved by the method and apparatus as defined in the appended claims. The invention may also be implemented by a computer program product.

According to an embodiment of the invention, a central GW controller is provided in a mobile communications network system, that performs an enhanced GW selection.

According to at least one embodiment of the invention, introduction of a new GW selection and mobility management procedures among distributed GWs controlled by a central GW controller is enabled without the need to upgrade the MME. Only DNS database needs to be updated.

In the following the invention will be described by way of embodiments thereof with reference to the accompanying drawings.

DESCRIPTION OF THE EMBODIMENTS

Figure 2:
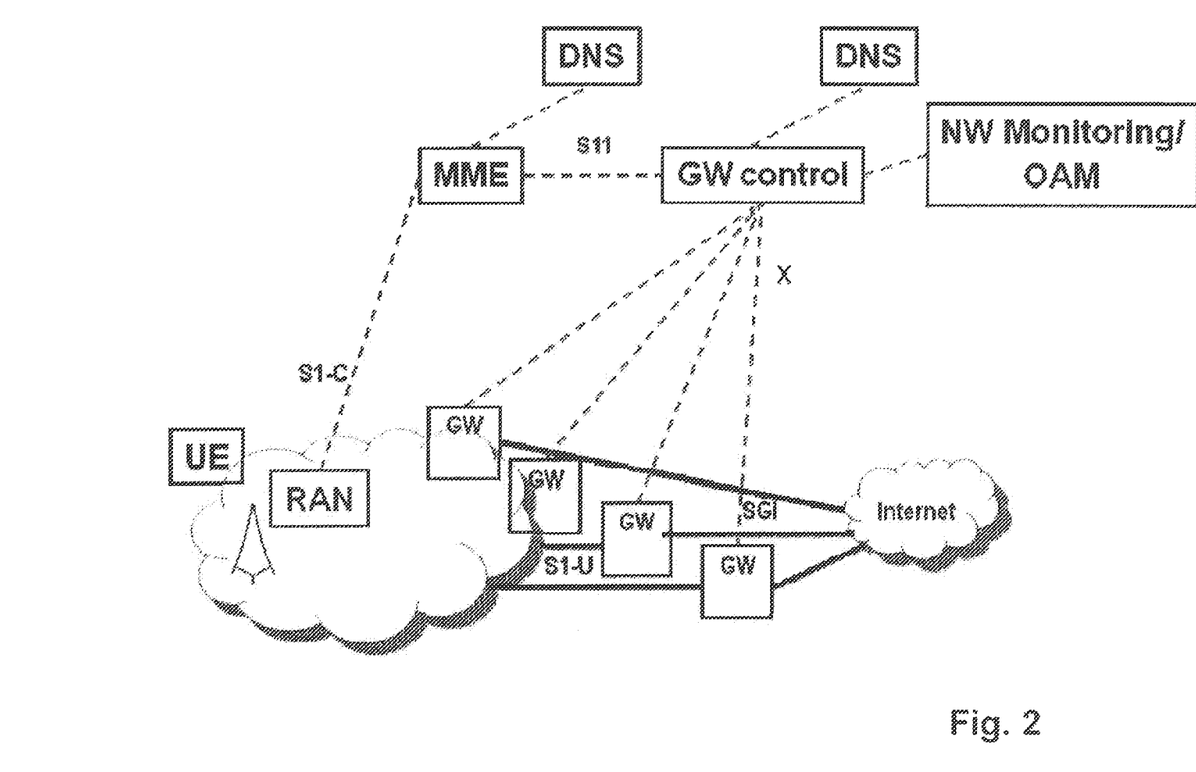
FIG. 2 shows a schematic diagram illustrating an EPC architecture including a central controller "GW control" according to an exemplary embodiment of the invention.

For the implementation of new technologies like new mobility management schemas, centralization of control functions that formerly reside in the S/PGW or the use of OpenFlow, a central control entity is introduced called "GW control", as illustrated in FIG. 2 which shows an EPC network architecture according to an exemplary embodiment of the invention. This central controller is implemented in such a way that the central controller combined with a group of distributed GW elements (termed GVV) can be seen as one logical gateway entity from an MME point of view. For the MME only one S/PGW exists this way. Consequently, the MME connects to the GW control in FIG. 2 with an S11 interface.

The central controller is a termination point of 3GPP specified signaling and provides parts of SGW and PGW functionality, such as an assignment of IP addresses. It has to keep UE contexts, etc.

The distributed GW elements "GW" in the network contain user plane functions like the S/PGW of the EPC, such as data tunneling and forwarding and mobility anchoring. But these functions might be modified according to new proposed enhancements and technologies that the GWs under the central controller "GW control" will support.

If GTP tunnels are used, GTP tunnel management has to be supported e.g. for the S1-U interface.

An interface between the GW control and the GWs is termed X. As implementation options, the X interface may be implemented based on GTP-C messages or OpenFlow messages or a combination of both. Part of signaling traffic received from the MME via the S11 interface is terminated in the GW control and other parts are forwarded to the distributed GWs via an S11x interface.

This kind of introduction of a central controller results in a modified GW selection:

The GW selection in a mobile network/EPC is divided into two steps: first the MME performs a usual GW selection. For this purpose it takes location information of a UE into account, e.g. eNodeB-ID, TAC, as described for SIPTO. If for a specific (or the whole) region of the network the proposed mobility schema/technology is deployed, this GW selection provides an address of a corresponding "GW control" entity.

The central GW control entity performs a second GW selection. For this purpose it may use the information provided by the MME as APN and UE location information. In addition, the central GW control entity may have access to transport network related information. This is depicted in FIG. 2 by a function "NW Monitoring/OAM". This function enables the central controller when selecting a distributed GW for the UE to take into account transport network related information like load status of links or nodes or routing/transport costs of different paths. For this purpose it may also use information directly carried over the X interface formerly not available in the MME.

In FIG. 2, dashed lines show control/signaling traffic, and solid lines show user IP packets traffic.

Figure 3:
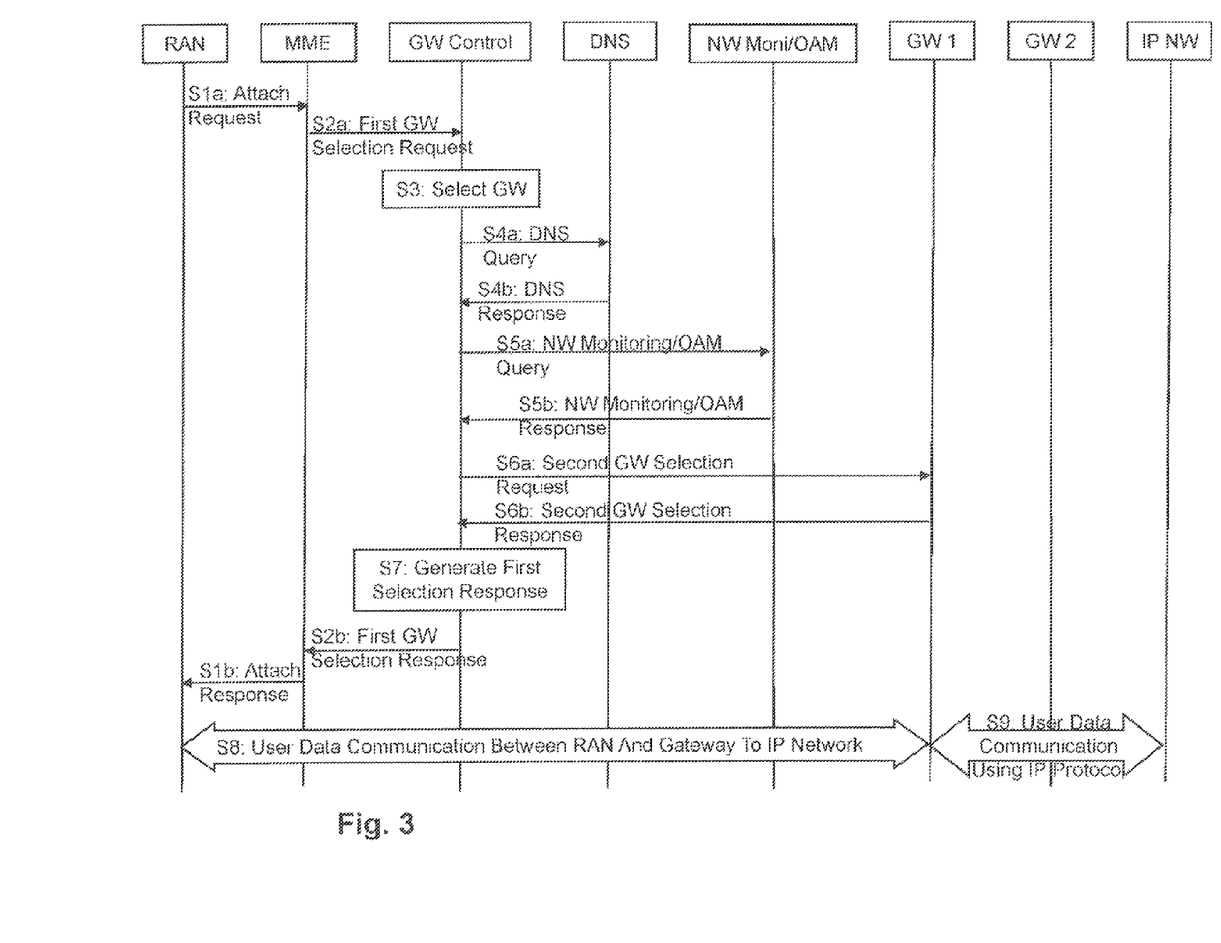
FIG. 3 shows a signaling diagram illustrating a procedure of selecting a GW for communicating user IP packets according to an embodiment of the invention.

FIG. 3 shows a signaling diagram illustrating the two step GW selection according to an embodiment of the invention. FIG. 3 shows signaling in a mobile communications network system comprising a RAN, an MME, a GW control, a DNS, a NW monitoring/OAM entity, a distributed gateway GW 1 and a distributed gateway GW 2 and an IP network. Association of these elements may be provided as illustrated in FIG. 2, for example.

During a UE attach procedure in which the RAN, via which the UE accesses the mobile communications network system, issues an attach request to the MME e.g. via an S1-C interface (step S1a in FIG. 3), the GW selection is performed first by the MME. The MME selects the central controller GW control as a termination point of signaling messages according to a first protocol, e.g. as a GTP-C end point address for an S11 interface, and issues a first GW selection request (e.g. a create session request) via an interface of a first network technology, e.g. the S11 interface, in step S2a. It is to be noted that in the architecture shown in FIG. 1 the GTP-C end point is an SGW address. In the proposed architecture, the signaling messages between the MME and the endpoint of the interface of the first network technology are terminated in the centralized GW control.

Only one or a few central controllers may exist in the NW, so the GW selection becomes a simple exercise for the MME and is achieved by setting the DNS data base accordingly (not illustrated in FIG. 3).

A second GW selection is performed by the GW control in step S3 to allocate a distributed GW.

Before allocating an UE IP address in step S3, the GW control may select for the UE a distributed GW taking into account different information: subscription data, the used APN, but also transport network related information like load status of links or nodes or routing/transport costs of different paths. For this purpose it can use information from DNS servers and other network management and monitoring systems. For example, FIG. 3 shows the DNS from which the GW control acquires information in steps S4a, S4b, and the NW monitoring/OAM entity from which the GW control acquires information in steps S5a, S5b. The GW control may acquire transport network related information over an interface of a second network technology, e.g. the X interface, which process is not shown in FIG. 3.

In the embodiment shown in FIG. 3, the GW control selects the distributed GW 1 for communicating user data in the mobile communications network system between an entity of the first protocol, e.g. an eNB of the RAN, and a network of a second protocol, e.g. an IP network such as the Internet.

In step S6a the GW control sends a second GW selection request via the interface of the second network technology independent from the first network technology to the selected distributed GW 1. The GW control may also provide a part of the signaling received from the MME via the interface of the second network technology. The interface of the second network technology may by the X interface shown in FIG. 2. The GW control may trigger a context establishment in the selected distributed GW 1 on the X interface e.g. by using S11 "create session" messages. The distributed GW 1 may respond to the request in step S6b via the interface of the second network technology, and may provide GTP parameters for an S1-U tunnel back to the GW control in case GTP tunneling is supported.

In step S7 the GW control may generate a response to the first selection request, including an indication of the selected distributed gateway GW 1, and provide the response via the interface of the first network technology to the MME in step S2b. For example, in step S2b, in an S11 create session response message, during the attach or a PDN connectivity procedure, the GW control returns back to the MME a GTP S1-UP uplink address for the eNB: this is the IP address and TEID of the selected distributed GW 1. In contrast to the conventional architecture of FIG. 1, the GTP S1-UP uplink address for the eNB is not an IP address of the SGW selected by the MME.

In the attach response in step S1b, the MME sends the indication of the selected distributed gateway GW 1 to the RAN (i.e. to the eNB of the RAN).

With the above procedure, communication of user data between the RAN and the GW 1 (step S8) according to the first protocol, and between the GW 1 and the IP network (step S9) according to the second protocol is enabled.

Figure 4:
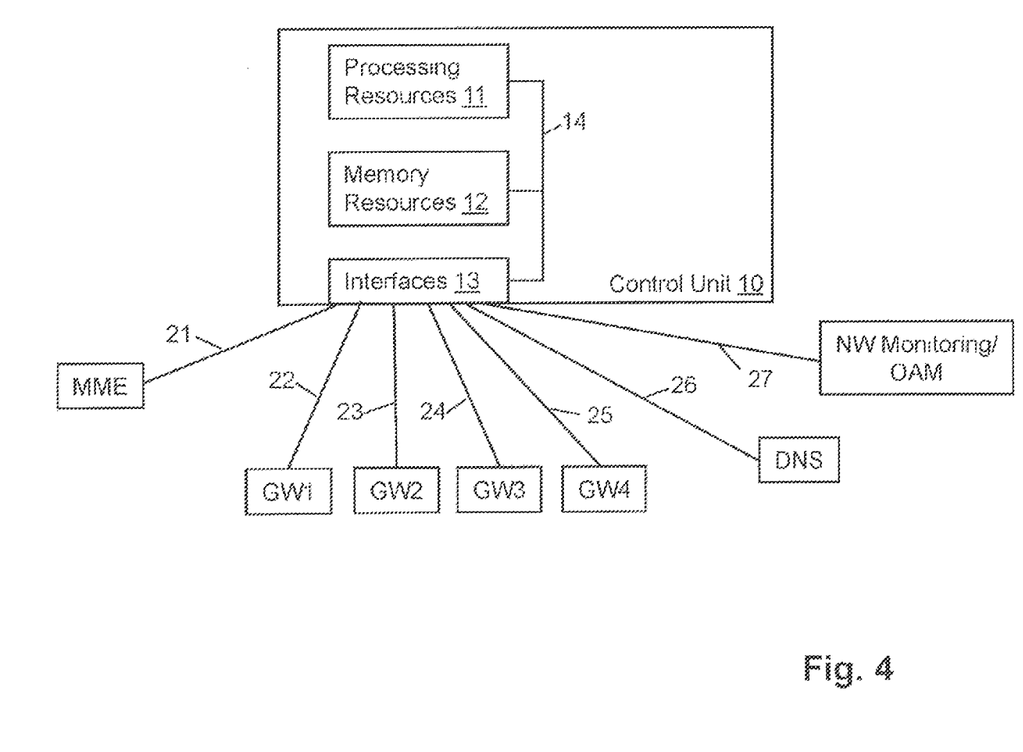
FIG. 4 illustrating a simplified block diagram of various electronic devices that are suitable for use in practicing the exemplary embodiments of this invention.

Now reference is made to FIG. 4 for illustrating a simplified block diagram of various electronic devices that are suitable for use in practicing the exemplary embodiments of this invention.

In particular, FIG. 4 illustrates a structure of a control unit 10 which comprises processing resources 11, memory resources 12 and interfaces 13, which are connected via a link 14. The memory resources 12 may store a program. The control unit 10 may be part of or may be used by the GW control illustrated in FIGS. 2 and 3.

The control unit 10 may be connected, through its interfaces 13, to an MME via a link 21, such as an S11 interface, to distributed gateways GW1 to GW4 via links 22 to 25, such as X interfaces, to a DNS via a link 26 and to an NW monitoring/OAM entity via a link 27. The MME, GW1 to GW4, DNS and NW Monitoring/OAM entity may correspond to the MME, the distributed gateways GW, the DNS connected to the GW control, and the NW Monitoring/OAM entity illustrated in FIG. 2. The control unit 10 using its processing resources 11, memory resources 12 and interfaces 13 may execute the operation of the GW control as described with respect to FIGS. 2 and 3.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

The program stored in the memory resources 12 is assumed to include program instructions that, when executed by the associated processing resources 11, enable the electronic device to operate in accordance with the exemplary embodiments of this invention, as detailed above.

In general, the exemplary embodiments of this invention may be implemented by computer software stored in the memory resources 12 and executable by the processing resources 11 of the control unit 10, or by hardware, or by a combination of software and/or firmware and hardware.

The memory resources 12 may be of any type suitable to the local technical environment and may be implemented using any suitable data storage technology, such as semiconductor-based memory devices, magnetic memory devices and systems, optical memory devices and systems, fixed memory and removable memory. The processing resources may be of any type suitable to the local technical environment, and may include one or more of general purpose computers, special purpose computers, microprocessors, digital signal processors (DSPs) and processors based on a multi-core processor architecture, as non-limiting examples.

According to an aspect of the invention, a gateway control apparatus of a mobile communications network system, which may include or use the control unit 10 of FIG. 4, and which is a termination point of signaling messages according to a first protocol, comprises detecting means for detecting a first selection request via an interface of a first network technology from a mobility management entity, of selecting the gateway control apparatus for communicating user data in the mobile communications network system between an entity of the first protocol and a network of a second protocol, selecting means for selecting a distributed gateway device from plural distributed gateway devices for communicating the user data, based on the detected first selection request, and first providing means for providing a second selection request of selecting the distributed gateway device via an interface of a second network technology independent from the first network technology.

The gateway control apparatus may comprise means for acquiring transport network related information, wherein the selecting means may select the distributed gateway device based on the transport network related information.

The transport network related information may comprise load status of links or nodes and/or routing/transport costs of different paths, wherein the transport network related information may be acquired over the interface of the second network technology, e.g. by the first providing means.

The first providing means may provide a part of signaling traffic received from the mobility management entity with the first selection request via the interface of the second network technology.

The apparatus may comprise generating means for generating a response to the first selection request, including an indication of the distributed gateway device, and second providing means for providing the response via the interface of the first network technology.

The interface of the first network technology may comprise an S11 interface, the interface of the second network technology may comprise a general packet radio service tunneling protocol, an open flow protocol or a combination thereof, the first protocol may comprise a general packet radio system protocol, and the second protocol may comprise an internet protocol.

The detecting means, the selecting means, the first and second providing means, the acquiring means and the generating means may be implemented by the processing resources 11, the memory resources 12 and the interfaces 13 of the control unit 10.

According to an embodiment of the invention, a gateway control apparatus of a mobile communications network system, which is a termination point of signaling messages according to a first protocol, detects a first selection request via an interface of a first network technology from a mobility management entity, of selecting the gateway control apparatus for communicating user data in the mobile communications network system between an entity of the first protocol and a network of a second protocol. Based on the detected first selection request, the gateway control apparatus selects a distributed gateway device from plural distributed gateway devices for communicating the user data, and provides a second selection request of selecting the distributed gateway device via an interface of a second network technology independent from the first network technology.

It is to be understood that the above description is illustrative of the invention and is not to be construed as limiting the invention. Various modifications and applications may occur to those skilled in the art without departing from the true spirit and scope of the invention as defined by the appended claims.

The invention claimed is:

1. A method comprising:
a method for use by a gateway control apparatus of a mobile communications network system, the gateway control apparatus being a termination point of signaling messages according to a first communication protcol, comprising:
detecting a first selection request via an interface of a first network technology from a mobility management entity, that is selecting the gateway control apparatus for communicating user data in the mobile communications network system between an entity using the first communication protocol and a network using a second communication protocol;
receiving from a network monitoring/operations and maintenance function information comprising at least one subscription data, used access point network, and transport network related information including at least one of load status of links, routing costs of different paths and transport costs of different paths;
based on the detected first selection request and the received information, selecting a distributed gateway device from plural distributed gateway devices for communicating the user data between the first network technology and the distributed gateway device using the first communication protocol; and
providing a second selection request selecting the distributed gateway device via an interlace of a second network technology independent from the first network technology for communicating the user data between the distributed gateway device and the second network technology using the second communication protocol.

2. The method of claim 1, comprising:
acquiring transport network related information including at least one of load status of links, routing costs of different paths, and transport costs of different paths; and
selecting the distributed gateway device base on the transport network related information.

3. The method of claim 2, wherein the transport network related information is acquired over the interface of the second network technology.

4. The method of claim 1, comprising:
providing a part of signaling traffic received from the mobility management entity with the first selection request via the interface of the second network technology.

5. The method of claim 1, comprising:
generating a response to the first selection request, including an indication of the distributed gateway device; and
providing the response via the interface of the first network technology.

6. The method of claim 1, wherein
the interface of the first network technology comprises an interface,
the interface of the second network technology comprises a general packet radio service tunneling protocol, an open flow protocol or a combination thereof,
the first communication protocol comprises a general packet radio system protocol, and/or the
second communication protocol comprises an internet protocol.

7. A non-transitory computer-readable medium storing a computer program product including a program for a processing device, comprising software code portions executed by a processor to perform the method of claim 1 when the program is run on the processing device.

8. The computer program product according to claim 7, wherein the program is directly loadable into an internal memory of the processing device.

9. An apparatus of a mobile communications network system, the apparatus being a termination point of signaling messages according to a first communication protocol, the apparatus comprising:
at least one processor; and
at least one memory including computer program code, where the at least one memory and the computer program code are configured, with the at least one processor, to cause the apparatus to at least:
detect a first selection request via an interface of a first network technology from a mobility management entity, that is selecting the apparatus for communicating user data in the mobile communications network system between an entity using the first communication protocol and a network using a second communication protocol;
receive from a network monitoring/operations and maintenance function information comprising at least one subscription data, used access point network, and transport network related information including at least one of load status of links, routing costs of different paths and transport costs of different paths;
based on the detected first selection request and the received information, select is distributed gateway device from plural distributed gateway devices for communicating the user data between the first network technology and the distributed gateway device using the first communication protocol; and
provide a second selection request of selecting the distributed gateway device via an interface of a second network technology independent from the first network technology for communicating the user data between the distributed gateway device and the second network technology using the second communication protocol.

10. The apparatus of claim 9, wherein the at least one memory including the computer program code is configured with the at least one processor to cause the apparatus to:
acquire transport network related information; and
select the distributed gateway device based on the transport network related information.

11. The apparatus of claim 10, wherein the transport network related information comprises at least one of load status of links or nodes and routing/transport costs of different paths, and wherein the transport network related information is acquired over the interface of the second network technology.

12. The apparatus of claim 9, wherein the at least one memory including the computer program code is configured with the at least one processor to cause the apparatus to:
provide a part of signaling traffic received from the mobility management entity with the first selection request via the interface of the second network technology.

13. The apparatus of claim 9, wherein the at least one memory including the computer program code is configured with the at least one processor to cause the apparatus to:
generate a response to the first selection request, including an indication of the distributed gateway device; and
provide the response via the interface of the first network technology.

14. The apparatus of claim 9, wherein
the interface of the first network technology comprises an interface,
the interface of the second network technology comprises a general packet radio service tunneling protocol, an open flow protocol or a combination thereof, and/or
the first protocol comprises a general packet radio system protocol, and/or the second protocol comprises an internet protocol.

* * * * *

UNITED STATES PATENT AND TRADEMARK OFFICE
CERTIFICATE OF CORRECTION

PATENT NO. : 9,467,939 B2
APPLICATION NO. : 14/390054
DATED : October 11, 2016
INVENTOR(S) : Hahn It is certified that error appears in the above-identified patent and that said Letters Patent is hereby corrected as shown below:

In the claims

Claim 1, col. 7, line 28 "protcol" should be deleted and --protocol-- should be inserted.

Claim 1, col. 7, line 51 "interlace" should be deleted and --interface-- should be inserted.

Claim 2, col. 7, line 62 "base" should be deleted and --based-- should be inserted.

Claim 9, col. 8, line 52 "is" should be deleted and --a-- should be inserted.

Signed and Sealed this
Twentieth Day of December, 2016

Michelle K. Lee
*Director of the United States Patent and Trademark Office*